Patented Sept. 11, 1951

2,567,281

UNITED STATES PATENT OFFICE 2,567,281

FLUSHED METHYL VIOLET INKS

Morris A. Gardepe, Dover, N. J., assignor to Sun Chemical Corporation, New York, N. Y., a corporation of Delaware No Drawing. Application February 6, 1948, Serial No. 6,809

6 Claims. (Cl. 106—27)

This invention relates to methyl violet inks and more particularly to methyl violet inks such as are commonly referred to as "flushed" inks.

One object of the present invention is to provide flushed methyl violet inks in which the pigment is dispersed in an ink vehicle comprising a substantially neutral liquid carrier component and a resinous binder component dissolved or dispersed therein.

Another object of the present invention is to provide a method by which methyl violet pigment may be flushed into such vehicles.

Other objects of the present invention will be apparent from the description and appended claims.

Methyl violet pigment has long been utilized as a toner for carbon black printing inks to impart certain improved qualities to the imprinted film. Characteristic of such inks is a lustre and density of color not ordinarily obtained by carbon black ink alone. This has the advantage of allowing for the use of less costly carbon black pigments in printing inks. Furthermore, many carbon black inks when imprinted exhibit a brown tone due to the color of the specific ink vehicle utilized in these inks, which can be eliminated by the addition of methyl violet toners to such inks. These toners are usually incorporated into printing inks by incorporating the dry pigment in the ink which is to be toned, or by flushing the pulp pigment into a suitable vehicle which is then utilized to tone carbon black inks by adding and mixing the toner into such inks. The term "methyl violet pigment" as employed in the present invention refers to the insoluble, solid coloring material obtained from methyl violet dye in accordance with procedures well known in the art, as opposed to the water-soluble coloring material which is the methyl violet dye.

The principle employed in the flushing process consists in producing oil or varnish dispersions of pigments directly from aqueous pastes of such pigments by the preferential wetting of the said pigments by the oil or varnish vehicles, with the consequent separation and elimination of the water previously contained in the pigment paste or pulp.

In the flushing process, the pulp pigment, or press cake, as it is known, is charged into a jacketed kneading type mixer or "flusher" together with a calculated quantity of the vehicle. During subsequent mixing, the pigment is slowly transferred from the aqueous medium in which it is dispersed to the ink vehicle by the preferential wetting of the pigment by the vehicle. The separated water is drawn off from time to time and the last traces of water are removed by heating the mixture either at atmospheric pressure or under partial vacuum conditions.

This process has the advantage of eliminating many of the operations necessary in the manufacture of dry pigments and their utilization in inks. Such operations include drying and pulverization of the pigment and subsequent dry blending, mixing, and incorporating of the dried pigment in ink vehicles. The flushing operation frequently results in a saving of time and power and a lowering of the cost in the production of printing inks.

Furthermore, flushed inks are generally characterized by excellent wetting and dispersion of the pigment particles in inks of this type. By this process, the extremely fine dispersion of the particles obtained in the manufacture of aqueous suspensions of the pigment is maintained, upon transfer, directly to the ink vehicle into which the pigment is flushed with the same degree of dispersion as is had in the pulp. This has the further advantage of eliminating the hard lumps and aggregates frequently formed in ink vehicles by the use of the dry pigment.

Heretofore, the use of methyl violet pigment in the manufacture of inks by the flushing process has been limited to certain types of ink vehicles such as lithographic varnishes and the like. Methyl violet inks in which the ink vehicle comprised a substantially neutral liquid carrier component, such as a high boiling petroleum hydrocarbon solvent, and a resinous binder component dissolved or dispersed therein, have hitherto not been made with any degree of success by the flushing process. Such inks were usually short, buttery, without flow, and dirty, and formed lumpy aggregates of the pigment particles due to insufficient wetting of the pigment by the vehicle and poor dispersion therein. Therefore in the manufacture of such inks, it has been necessary to use the dry, pulverized pigment which involves the more costly, and time and power consuming process of incorporating the dry pigment into the ink vehicle by milling operations.

I have found that the difficulties inherent in the production of such flushed methyl violet inks are overcome by the addition to the ink vehicle-pigment admixture during the flushing operation of a higher fatty acid material and a compound resulting from the reaction of a fatty acid material and a compound having the general formula

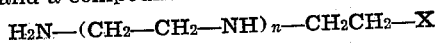

$$H_2N-(CH_2-CH_2-NH)_n-CH_2CH_2-X$$

where X represents a radical selected from the group consisting of amino and hydroxyl radicals and where $n$ represents an integer from 1 to 4. The compounds represented by the above general formula are characterized by the fact that they contain at least 2 amino groups and that the carbon atoms contained in the said compounds are arranged in hydrocarbon radicals containing only 2 carbon atoms. Among the compounds which comprise this group as set forth in the present invention are included the polyethylenepolyamines containing up to four hydrocarbon radicals of 2 carbon atoms each, and the monohydroxy derivatives of the said polyethylenepolyamines. The reaction products of the fatty acids and the compounds designated by the above illustrated general formula have, in the process outlined in the present invention, the functions of a dispersing agent and are hereinafter termed as such.

As is well known, the solution of a resinous material in a solvent results in a vehicle of greater viscosity then that of the solvent employed, and the viscosity of the solution increases in proportion to the amount of solids dissolved therein. The further addition to such a resinous solution of a pigment in gradually increasing amounts also causes corresponding increases in the viscosity of such vehicles, particularly if the wetting of the pigment by the vehicle is poor. By the term "wetting" is meant the interaction between a solid phase and a liquid phase whereby the two are enabled to come into contact with a certain degree of adhesion between them. Poor wetting conditions may be remedied and the viscosity of such pigment-vehicle admixtures thereby reduced by the addition to the said admixture of an agent which decreases the resistance of the pigment toward wetting by the particular vehicle utilized. It has been found that the resistance to wetting of methyl violet pigment by a resinous vehicle as described in the present invention is extremely high. Furthermore, in the inks of the present invention, the percentages of resinous material to solvent and of the pulp pigment to vehicle are so great that without the addition to the vehicle-pigment admixture of such an agent which decreases the resistance to wetting of the methyl violet pigment by the said vehicle, in this case a higher fatty acid material, a highly viscous paste would be formed which would greatly hinder the mixing action of the flusher and the transfer of an amount of pigment from the aqueous medium to the ink vehicle necessary to obtain the increased color strength of the inks of the present invention. Therefore, the primary function of the said fatty acid material as utilized in the present invention is to increase the ability of the ink vehicle to wet the methyl violet pigment in preference to the aqueous medium in which the pigment is originally contained, thereby facilitating the transfer of an increased amount of the pigment to the ink vehicle and the consequent separation of water from the flushing admixture. The more complete wetting of the pigment by the ink vehicle due to the presence of the said fatty acid material has the further effect of reducing the viscosity and increasing the fluidity of the ink vehicle-pigment admixture, thereby increasing the mechanical efficiency of the mixer and enabling the flushing operation to be completed in a much shorter time.

While the presence of a higher fatty acid results in a more complete wetting of the methyl violet pigment, it does not necessarily result in a complete dispersion of the pigment in the vehicle. Due to the attraction of the pigment particles for each other, small lumps or aggregates of the pigment particles may be formed which are undesirable in printing inks. The specific compounds which I have above termed dispersing agents, when added to the flushing admixture, seem to have the faculty of overcoming the attraction of the pigment particles for each other in some manner making possible the maintenance of as complete a degree of dispersion as is had originally in the pulp. One theory which may explain the manner in which this is accomplished is as follows.

Dispersions are distributions of fine particles of one substance in another, the latter called the dispersing medium. The concentration of a layer of the dispersing medium at the surface of the dispersed substance is known as adsorption, and the interaction between the two substances is a particular form of adhesion. Dispersions of pigments in vehicles, depending to a great extent upon the particle size of the pigment and the affinity of the dispersing medium for the said pigment, generally have a tendency to separate from a state of dispersion into aggregates of pigment particles due to the difference in specific gravity of the dispersed substance and the dispersing medium. It may be assumed that when the dispersing agents of the present invention are added to the vehicle-pigment admixture much the same action takes place between the dispersed substance and the dispersing medium as is had in the formation of stable emulsions by the addition of an emulsifying agent. It may be that the molecules of these compounds are adsorbed by the pigment particles and at the same time form a bond with the ink vehicle or dispersing medium since they are known to have a strong affinity for the solvents used in the inks of the present invention. It may be that the formation of such bonds between the pigment particles and the vehicle are strong enough to counteract the tendency toward separation of the pigment particles from the dispersing medium due to the difference in specific gravity between the two or due to the attraction of the particles for each other.

Linseed fatty acid is utilized in the examples of inks illustrating my invention as hereinafter set forth. However, higher fatty acid materials such as stearic, palmitic, lauric, oleic, linoleic and others comprising this group may be substituted in these inks, as well as fatty acid materials such as wool grease and the like.

The fatty acid and the dispersing agent seem to have the faculty of overcoming the resistance of the methyl violet pigment to complete wetting and dispersion of the pigment particles in such resinous ink vehicles as are described above, resulting in inks of increased color strength over such hitherto available inks. The fatty acid also serves the further purpose of softening the body of the finished ink and increasing its flow properties. The percentage of fatty acid utilized in the inks of the present invention may be varied in accordance with the specific qualities desired in such inks. However, to satisfactorily achieve the desired results of the present invention I prefer to employ the fatty acid material in an amount between approximately 5 and 15 per cent of the finished ink.

In the utilization of the above mentioned dispersing agents it was found that an excess of such materials in the inks of the present invention may have a deleterious effect upon the properties of the inks. An amount in excess of 4 parts by weight of the total flushed ink generally is somewhat detrimental to the setting of the imprinted ink film. Therefore, only enough to accomplish the desired effect should be added to the flushing vehicle. I have found that an amount of the dispersing agent corresponding to a percentage of between approximately 1 and 4 per cent of the finished ink will provide inks satisfactory for successful commercial applications.

Examples are hereinafter given of methyl violet inks illustrating my invention, and the procedure followed in making such inks.

One formula for satisfactorily carrying out my invention comprises the following proportions of materials.

Formula #1

534 lbs. of an ink vehicle, containing:
- 293.7 lbs. resinous reaction product of pentaerythritol and abietic acid.
- 240.3 lbs. petroleum hydrocarbon solvent (B. P. 285–300° C.). The resin and solvent are heated to solution at 350° F.

Methyl violet pulp in an amount containing:
- 400 lbs. methyl violet pigment.
- 102 lbs. linseed fatty acid.
- 20 lbs. 1-hydroxyethyl-2-heptadecenyl glyoxalidine.
- 144 lbs. petroleum hydrocarbon solvent (B. P. 285–300 C.).

In carrying out my invention, approximately 50% of the methyl violet pulp together with approximately 350 lbs. of the ink vehicle are charged into a jacketed mixing machine, or "flusher," and admixed until the ink vehicle has replaced the water contained in the pigment. After this "break" has taken place, the separated water is decanted and one half of the remaining pulp and as much of the ink vehicle as needed to obtain further separation of water are added to the materials already in the mixer and the whole is admixed till a second break is obtained. The separated water is again withdrawn and the remainder of the pulp together with the remainder of the ink vehicle and the linseed fatty acid are added to the batch in the mixer and the whole is again admixed until there has separated as much water as is possible by such mixing action. The separated water is again decanted and the dispersing agent is slowly added to the flushed paste while mixing. It is essential that the dispersing agent be added slowly to prevent too rapid a breakdown of the flushed paste which would result in the formation of large lumps in the finished ink.

To remove the water still remaining in the flushed paste, the mixing is continued in a partial vacuum with gradual application of heat to the mixer. This drying operation should be carefully controlled. The batch is brought up to a temperature of 120° F. over a period of approximately four and one half to five hours. Temperatures in excess of 120° F. during this operation will burn the ink causing a loss in color strength.

The flushed paste is then thinned to the desired consistency by the addition of the petroleum hydrocarbon solvent.

Analysis of the flushed methyl violet ink shows the following formula.

Formula #2

| | Parts by weight |
|---|---|
| Resinous reaction product of pentaerythritol and abietic acid | 24.5 |
| Methyl violet pigment | 33.3 |
| Linseed fatty acid | 8.4 |
| Petroleum hydrocarbon solvent (B. P. 285–300° C.) | 32.1 |
| 1 - Hydroxyethyl - 2 - heptadecenyl glyoxalidine | 1.7 |
| | 100.0 |

It is important that the water content of the ink be less than 3%. Moisture in excess of 3% will cause loss of color strength and retard the setting time of such inks. The rub-proof quality of the imprinted film will also be impaired.

Another ink satisfactorily made according to my invention comprises the following materials.

Formula #3

534 lbs. of an ink vehicle containing:
- 312 lbs. zinc resinate.
- 222 lbs. petroleum hydrocarbon solvent (B. P. 300–315° C.). Resin and solvent heated to solution at 350° F.

Methyl violet pulp in an amount containing:
- 400 lbs. methyl violet pigment.
- 102 lbs. linseed fatty acid.
- 20 lbs. Reaction product of diethylenetriamine and linseed fatty acid.
- 144 lbs. petroleum hydrocarbon solvent (B. P. 300–315° C.).

The ink made with the proportions of materials as outlined above and in accordance with the procedure utilized for Formula #1 yields the following formula.

Formula #4

| | Parts by weight |
|---|---|
| Zinc resinate | 26.1 |
| Linseed fatty acid | 8.4 |
| Methyl violet pigment | 33.3 |
| Petroleum hydrocarbon solvent (B. P. 300–315° C.) | 30.5 |
| Reaction product of diethylenetriamine and linseed fatty acid | 1.7 |
| | 100.0 |

The inks of the present invention are free flowing and have a softness of body and strength of color which makes them ideal for use as toners of carbon black inks. When added to carbon black inks, in the proportions generally utilized for toners, they do not appreciably affect the consistency or body of such inks. Furthermore my inks enhance the gloss of such inks and exhibit quick setting properties, especially when utilized in inks which are set by heat.

The inks of the present invention may also be employed as printing inks by themselves, the required consistency for such utilization being obtained by the addition of a suitable ink vehicle, preferably the same as that utilized in making these inks. My inks may also be used in combination with printing inks of other colors to effect various desired shades of such colors.

Another advantage derived from the procedure as outlined above arises from the fact that methyl violet inks or toners may be made of the identical ink vehicle as that of the carbon black inks which are to be toned. Because of this fact, the addition of materials which are foreign to the formulation of the ink to be toned and which might possibly affect the drying properties of the ink, can be avoided.

This does not necessarily limit the use of my inks as they may also be utilized to tone inks which comprise linseed oil vehicles, other drying and non-drying oil vehicles and other solvent-resin vehicles compatible with my inks.

The term solution, or "dissolved in," as utilized in the present invention to describe an ink vehicle comprising a liquid carrier component and a resinous binder component, is not intended to apply solely to strictly molecular solutions. It is also intended to include such resin-solvent vehicles in which the resin is dispersed in the liquid carrier component to form a homogeneous, colloidal suspension.

While the above products constitute preferred embodiments of the invention, changes may be made therein, without departing from the scope of the present invention as defined in the appended claims.

What is claimed is:

1. An ink consisting of 32.1 per cent petroleum hydrocarbon solvent having a boiling point within the range 285–300° C., 24.5 per cent resinous reaction product of pentaerythritol and abietic acid, 8.4 per cent linseed fatty acid, 1.7 per cent 1-hydroxyethyl-2-heptadecenyl glyoxalidine, and 33.3 per cent methyl violet pigment.

2. A methyl violet ink comprising a petroleum hydrocarbon liquid vehicle having a boiling point within the range 285°–300° C. and a resinous binder dissolved therein, methyl violet pigment, 5–15% by weight of the ink of linseed flatty acid, and approximately 1–4% by weight of the ink of 1-hydroxyethyl-2-heptadecenyl glyoxalidine.

3. A methyl violet ink comprising a petroleum hydrocarbon liquid vehicle having a boiling point within the range 285°–300° C. and a resinous binder dissolved therein, methyl violet pigment, approximately 5–15% by weight of the ink of a higher fatty acid of from 12 to 18 carbon atoms, and approximately 1–4% by weight of the ink of 1-hydroxyethyl-2-heptadecenyl glyoxalidine.

4. A methyl violet ink comprising a petroleum hydrocarbon liquid vehicle having a boiling point within the range 285°–300° C. and a resinous reaction product of pentaerythritol and abietic acid dissolved therein, methyl violet pigment, approximately 5–15% by weight of the ink of a higher fatty acid of from 12 to 18 carbon atoms, and approximately 1–4% by weight of the ink of 1-hydroxyethyl-2-heptadecenyl glyoxalidine.

5. The process of preparing a dispersion of methyl violet pigment which comprises effecting solution of a resinous binder in a petroleum hydrocarbon liquid vehicle having a boiling point within the range 285°–300° C., mixing methyl violet pulp in an amount containing approximately one-half of the predetermined amount of methyl violet pigment to be dispersed with an amount of the solution of resinous binder, while agitating the admixture, sufficient to effect a separation of water contained in the said methyl violet pulp, removing the separated water from the admixture, adding approximately one-half of the remainder of the methyl violet pulp and as much of the remainder of the solution of resinous binder to the admixture, while agitating the same, sufficient to effect further separation of the water contained in the methyl violet pulp, again removing the separated water from the admixture, adding the remainder of the methyl violet pulp and the remainder of the solution of resinous binder to the admixture together with an amount of a higher fatty acid of from 12 to 18 carbon atoms corresponding to approximately 5–15% by weight based upon the weight of the completed dispersion and mixing the whole till the water contained in the methyl violet pulp has separated therefrom, removing the separated water from the admixture, thereafter slowly adding to the said admixture, while agitating the same, an amount of 1-hydroxyethyl-2-heptadecenyl glyoxalidine corresponding to approximately 1–4% by weight based upon the weight of the completed dispersion, and thereafter removing excess water by heating the said admixture under vacuum while agitating the same.

6. The process according to claim 5 in which the resinous binder is a resinous reaction product of pentaerythritol and abietic acid.

MORRIS A. GARDEPE.

REFERENCES CITED

The following references are of record in the file of this patent:

UNITED STATES PATENTS

| Number | Name | Date |
|---|---|---|
| 437,780 | Higgins | Oct. 7, 1890 |
| 1,487,873 | Marston | Mar. 25, 1924 |
| 1,986,029 | Todd et al. | Jan. 1, 1935 |
| 2,192,954 | Floan et al. | Mar. 12, 1940 |
| 2,355,837 | Wilson | Aug. 15, 1944 |
| 2,369,818 | De Groote | Feb. 20, 1945 |
| 2,434,168 | Krumbhaar | Jan. 6, 1948 |

FOREIGN PATENTS

| Number | Country | Date |
|---|---|---|
| 469,422 | Great Britain | July 26, 1937 |
| 469,559 | Great Britain | July 27, 1937 |